United States Patent
Kawai

(10) Patent No.: US 10,348,927 B2
(45) Date of Patent: Jul. 9, 2019

(54) PRINTING APPARATUS FOR CONTROLLING START OF PRINTING PROCESS

(71) Applicant: Brother Kogyo Kabushiki Kaisha, Nagoya-shi, Aichi-ken (JP)

(72) Inventor: Junya Kawai, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/638,635

(22) Filed: Jun. 30, 2017

(65) Prior Publication Data

US 2018/0152588 A1     May 31, 2018

(30) Foreign Application Priority Data

Nov. 30, 2016   (JP) .................................. 2016-233581

(51) Int. Cl.
| | |
|---|---|
| *G06F 3/12* | (2006.01) |
| *H04N 1/23* | (2006.01) |
| *H04N 1/32* | (2006.01) |
| *G06K 15/02* | (2006.01) |

(52) U.S. Cl.
CPC ....... *H04N 1/32101* (2013.01); *G06F 3/1208* (2013.01); *G06F 3/1217* (2013.01); *G06F 3/1244* (2013.01); *G06F 3/1285* (2013.01); *G06F 3/1292* (2013.01); *G06K 15/181* (2013.01); *G06K 15/1817* (2013.01); *G06K 15/1823* (2013.01); *H04N 1/23* (2013.01)

(58) Field of Classification Search
CPC .... H04N 1/32101; H04N 1/23; H04N 1/1817; G06K 15/1817; G06K 15/181; G06F 3/1208; G06F 3/1285; G06F 3/1271; G06F 3/1292

See application file for complete search history.

(56) References Cited

U.S. PATENT DOCUMENTS

2006/0262335 A1* 11/2006 Varga .................... G06F 3/1208
                                                                    358/1.13

FOREIGN PATENT DOCUMENTS

| JP | H04-086063 A | 3/1992 |
|---|---|---|
| JP | 2012-076408 A | 4/2012 |

\* cited by examiner

*Primary Examiner* — Christopher Wait

(74) *Attorney, Agent, or Firm* — Banner & Witcoff, Ltd.

(57) ABSTRACT

A controller of a printing apparatus causes, in accordance with programs, the printing apparatus to obtain data and temporarily storing the received data in a buffer, create an image to be printed on a printing medium in accordance with the received data, obtain a receiving time period required to receive particular amount of data, obtain an image creating time period to create the image in accordance with the particular amount of data, obtain a total print length of a printing medium on which printing is executed in accordance with the data, calculate an amount of image which can be printed at a designated constant printing speed based on the receiving time period, the image creating time period and the total print length, and, when the calculated amount of image can be created, start a process of printing at the designated constant printing speed in accordance with the created image.

5 Claims, 4 Drawing Sheets

| CONCRETE EXAMPLES | RECEIVING TIME PERIOD (ms) | IMAGE CREATING TIME PERIOD (ms) | PREPARATION TIME PERIOD (dot/s) | PRINTABLE DATA AMOUNT (dot) |
|---|---|---|---|---|
| 1 | 30.0 | 120.0 | 3333.3 | – |
| 2 | 40.0 | 120.0 | 3125.0 | 568.7 |
| 3 | 40.0 | 200.0 | 2083.3 | 9827.9 |

PRINTING APPARATUS FOR CONTROLLING START OF PRINTING PROCESS

CROSS-REFERENCE TO RELATED APPLICATIONS

This application claims priority under 35 U.S.C. § 119 from Japanese Patent Application No. 2016-233581 filed on Nov. 30, 2016. The entire subject matter of the application is incorporated herein by reference.

BACKGROUND

Technical Field

The present disclosures relate to a printing apparatus configured to perform a printing operation in accordance with received print data.

Related Art

Conventionally, there has been known a printing apparatus which is configured to perform a printing operation in accordance with received print data. In such a printing apparatus, a printing speed is typically determined, by a speed calculating section, based on current data amount accumulated in a buffer memory and a current data receiving speed at a data receiving I/F. Then, the printing speed of the printing mechanism is controlled through a drive controller such that the printing speed of the printing mechanism is as close as possible to the determined printing speed.

SUMMARY

In a conventional printing apparatus as mentioned above, there is a possibility that irregularity of printing may occur and/or throughput (i.e., printing capability per unit time) may be lowered when the printing speed is changed during a printing operation.

According to aspects of the disclosures, there is provided a printing apparatus, which has a data receiving device, a storage device configured to store programs; and a controller. The controller causes, in accordance with the programs, the printing apparatus to perform obtaining received data through the data receiving device and temporarily storing the received data in a buffer, creating an image to be printed on a printing medium in accordance with the received data, obtaining a receiving time period required to receive particular amount of the received data through the data receiving device, obtaining an image creating time period to create the image in accordance with the particular amount of the received data, obtaining a total print length representing a length of the printing medium on which printing is executed in accordance with the received data, calculating an amount of image which can be printed at a designated constant printing speed based on the receiving time period, the image creating time period and the total print length, and, when the calculated amount of image can be created, starting a process of printing at the designated constant printing speed in accordance with the created image.

BRIEF DESCRIPTION OF ACCOMPANYING DRAWINGS

DETAILED DESCRIPTION OF THE ILLUSTRATIVE EMBODIMENT

Figure 1:
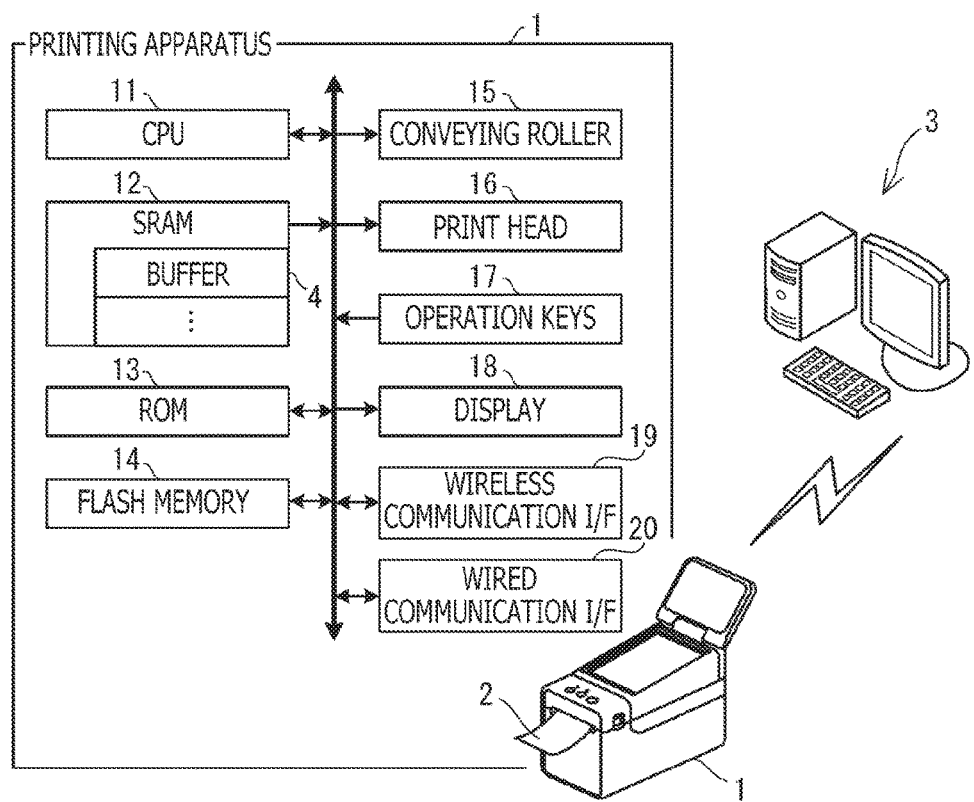
FIG. 1 is a block diagram of a printing apparatus according to an illustrative embodiment of the disclosures.

Hereinafter, referring to the accompanying drawings, a printing apparatus 1 according to an illustrative embodiment will be described. It is noted that the accompanying drawings show technical features which can be employed in the printing apparatus 1 according to the illustrative embodiment. Structures and components of the printing apparatus 1 and flowcharts shown in the drawings and illustrating processes of the printing apparatus 1 are only examples and not intended to limit the aspects of present disclosures.

FIG. 1 is a block diagram of the printing apparatus 1 according to the illustrative embodiment. The printing apparatus 1 is a compact printer configured to create adhesive label or tape by printing characters (e.g., letters, symbols, patterns and the like) on a tape, or elongated printing medium. The printing apparatus 1 is connectable with an external device such as a personal computer (PC) 3 or the like, and configured to generates print data based on data transmitted from the external device and print the characters based on the generated print data.

The printing apparatus 1 has a CPU (central processing unit) 11 configured to entirely control the printing apparatus 1. As shown in FIG. 1, the CPU 11 is electrically connected to an SRAM (Static Random Access Memory) 12, ROM (Read Only Memory) 13, a flash memory 14, a conveying roller 15, a print head 16, operation keys 17, a display 18, a wireless communication I/F (interface) 19, and a wired communication I/F 20.

The SRAM 12 temporarily stores data such as timer data, counter data and the like. The ROM 13 stores a control program of the CPU 11, BIOS (Basic Input/Output System), OS (Operation System) and the like. The flash memory 14 stores parameters, initial setting information and the like. The conveying roller 15 is configured to convey the tape accommodated in a tape cassette (not shown) which is attached to the printing apparatus 1. The print head 16 is configured to print characters on the tape conveyed by the conveying roller 15. The wireless communication I/F 19 is a controller enabling the printing apparatus 1 to perform a wireless communication with external devices such as a PC 3. The wired communication I/F 20 is a controller enabling the printing apparatus 1 to perform a wired communicate with external devices.

It is noted that the CPU 11 obtains a time period, for example, by referring to a timer implemented in the CPU 11. Generally, the timer of the CPU 11 starts when the CPU 11 is powered on. When the CPU 11 obtains a time period of a certain event, the CPU 11 obtains a first measured time of the timer when the event starts, and a second measured time of the timer when the event ends, and calculates the time period of the event by subtracting the first measured time from the second measured time. It is noted that, in the following description, to obtain the first measured time is expressed as the timer is started.

Figure 2A:
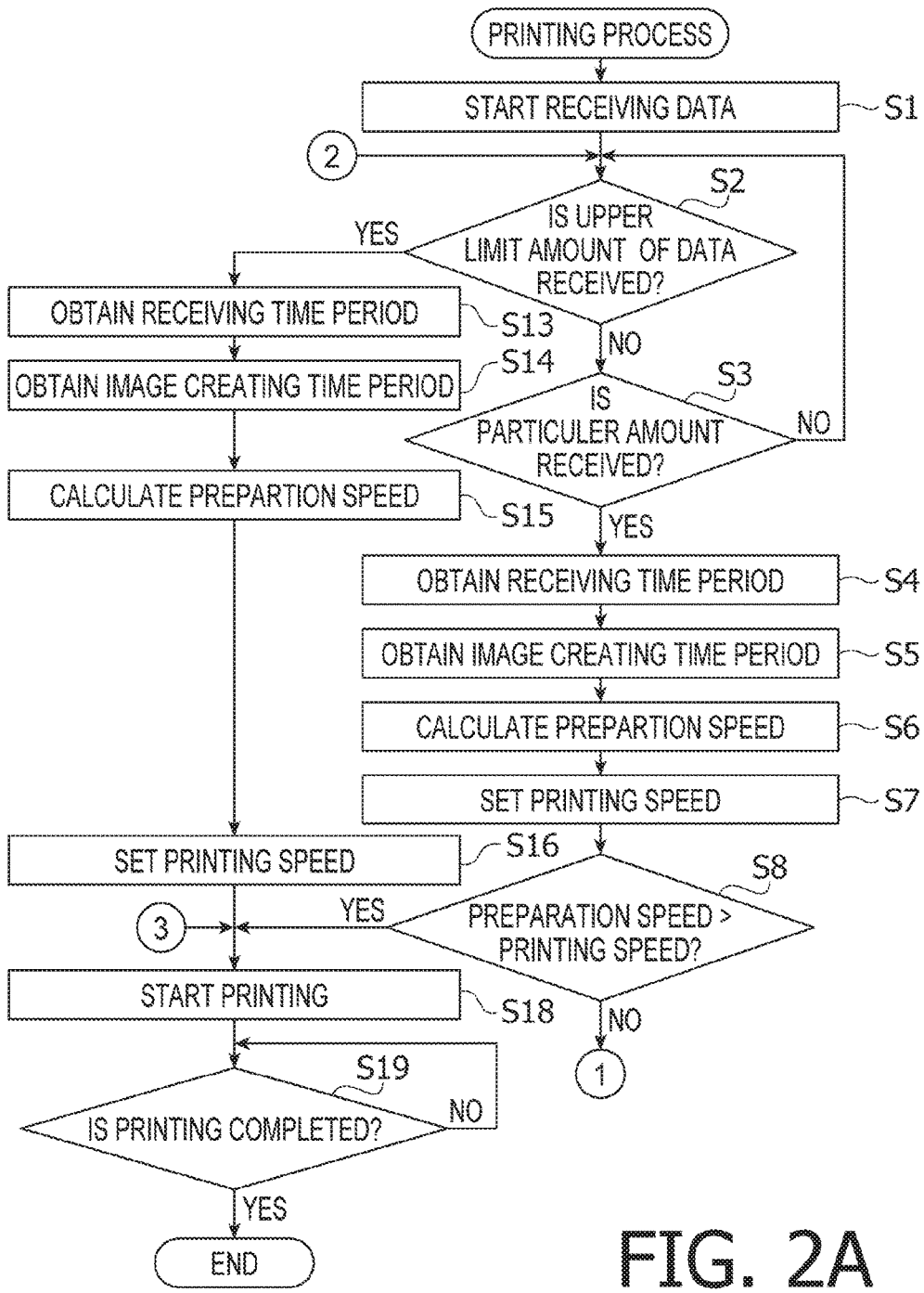
FIGS. 2A and 2B show a flowchart illustrating a printing process according to the illustrative embodiment.

Next, referring to FIGS. 2A, 2B and 3, a printing process executed by the printing apparatus 1 will be described referring to concrete examples 1-3 indicated in FIG. 3. In the printing process, a process of printing characters on a printing medium based on the print data which is received from an external device connected through the wireless communication I/F 19 or the wired communication I/F 20, is executed. As mentioned above, according to the illustrative embodiment, the printing medium of the printing apparatus 1 is a tape. The printing process shown in FIGS. 2A and 2B is started when the printing apparatus 1 receives a notification, from the external device, that print data is transmitted from the external device.

Figures 2B, 3:
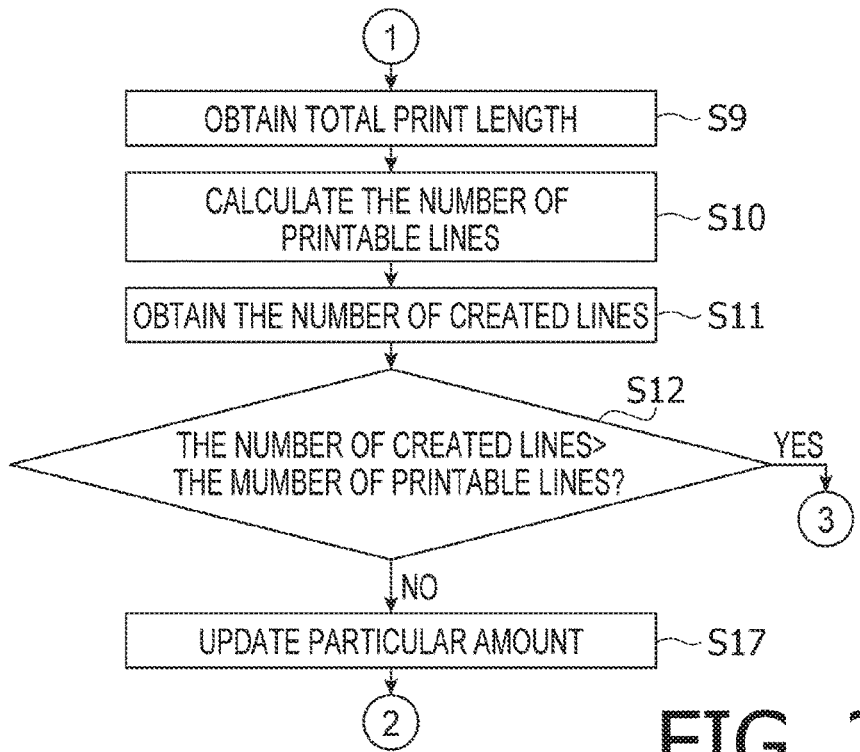
FIG. 3 is a table showing concrete examples of printing environments.

As shown in FIG. 3, a condition for a first concrete example includes a receiving time period of 30.0 ms (milliseconds) and an image creating time period of 120.0 ms. The receiving time period represents a time period necessary for the printing apparatus 1 to receive particular amount of data from the external device. The particular amount may be set taking a size of the buffer 4, the maximum printing speed and the like into account. According to the illustrative embodiment, a resolution of an image which is created based on the data is 360 dpi (dots per inch) and the particular amount is an amount of data corresponding to an image for 500 lines (i.e., dots) in a conveying direction. It is noted that the number of lines of the image can also be indicated by the number of dots arranged in the conveying direction of the printing medium. It is noted that the data amount of data for 500 dots (i.e., 500 lines) in the conveying direction corresponds to data amount of an image for about 35 mm in the conveying direction. The image creating time period is, therefore, a time period necessary for the printing apparatus 1 to create an image based on the above-mentioned amount of data. It is noted that the image is a dot pattern composed by multiple dots arranged in the conveying direction of the printing medium, and in an orthogonal direction which is orthogonal to the conveying direction. The image represents character strings and/or image strings.

A condition for a second concrete example includes a receiving time period of 40.0 ms, and an image creating time period of 120.0 ms. A condition for a third concrete example includes a receiving time period of 40.0 ms, and an image creating time period of 200.0 ms. In the following description, for an explanation purpose, the first, second and third concrete examples are described in parallel. In an actual operation, printing processes for first, second and third concrete examples are executed at different timings, respectively. It is further noted that the receiving time period could be affected by a specification of the external device, a usage condition of a network through which the data is transmitted, and the like. It is also noted that the image creating time period could be affected by other processes executed in the printing apparatus 1.

When the CPU 11 detects receipt of the data from the external device (e.g., PC 3), the CPU 11 retrieves a program to execute the printing process from a program storage area of the ROM 13, and temporarily stores the same in the SRAM 12. Then, in accordance with instructions included in the program stored in the SRAM 12, the CPU 11 executes respective steps of the printing process shown in FIGS. 2A and 2B. It is noted that parameters to execute the printing process are stored in the flash memory 14. Pieces of data generated during execution of the printing process are stored in the SRAM 12 when necessary.

Figure 4:
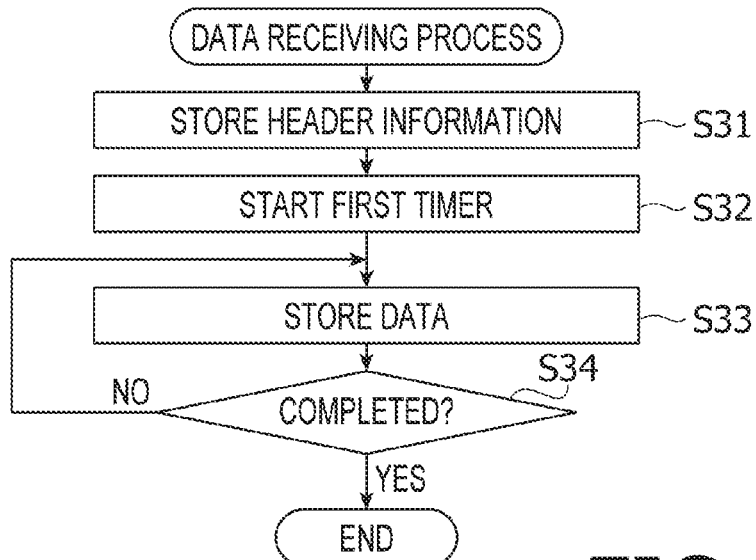
FIG. 4 is a flowchart illustrating a data receiving process according to the illustrative embodiment.

When the printing process is started, the CPU 11 starts a data receiving process (S1) in which the CPU 11 receives data transmitted from the external device and stores the same in the buffer 4. The data receiving process is shown in FIG. 4. As shown in FIG. 4, firstly, the CPU 11 stores header information of the received data in the SRAM 12 (S31), and starts a first timer to measure a data receiving time period (S32). The header information includes information on print conditions such as a total print length, which is a total length of the printing medium on which the printing process is executed based on the data. The CPU 11 repeatedly executes a process of storing received data in the buffer 4 (S33) until receipt of data is completed (S34: NO). During receipt of the data, the CPU 11 adds the received amount of data (e.g., by unit of byte) into a first counter of the SRAM 12. When receipt of the data is completed (S34: YES), the CPU 11 terminates the data receiving process.

In the printing process shown in FIGS. 2A and 2B, the CPU 11 determines whether an upper limit amount of data is received from the external device by comparing the amount of the received data with the value of the first counter of the SRAM 15 (S2). It is noted that the upper limit amount may be a preset amount, or the upper limit amount may be determined at each execution of printing process based on a user's instruction, kinds of data and the like. The upper limit amount may be a value representing the upper limit amount of data itself, or a value representing the number of printing media (e.g., the number of labels and the like) to which the printing process is applied based on the received data. According to the illustrative embodiment, the upper limit amount represents the quantity of data indicated by the number of lines, which is, for example, 50000 dots (i.e., data amount corresponding to the number of dots in the orthogonal direction multiplied by 50000 dots in the conveying direction). The amount of data received from the external device is stored, for example, in the first counter in the SRAM 12. The CPU 12 may determine whether the amount of data stored in the buffer 4 has reached the upper limit amount in S2.

When it is determined that the CPU 11 has not received the upper limit amount of data (S2: NO), the CPU 11 determines whether the particular amount of data has been received by comparing the amount of the received data with the value of the first counter of the SRAM 15 (S3). It is noted that the particular amount is less than the upper limit amount referred to in S2. It is noted that the particular amount may be a preset amount, or the particular amount may be determined at each execution of printing process based on a user's instruction, kinds of data and the like. When it is determined that the CPU 11 has not received the particular amount of data (S3: NO), the CPU 11 returns process to S2. It is noted that, when the CPU 11 has received the particular amount of data (S3: YES), the CPU 11 obtains the receiving time period (S4) with referring to the first timer which was started in S32 of FIG. 4. As shown in FIG. 3, the CPU 11 could receive 30.0 ms, 40.0 ms or 40.0 ms as the receiving time periods for the first-third concrete examples, respectively.

Figure 5:
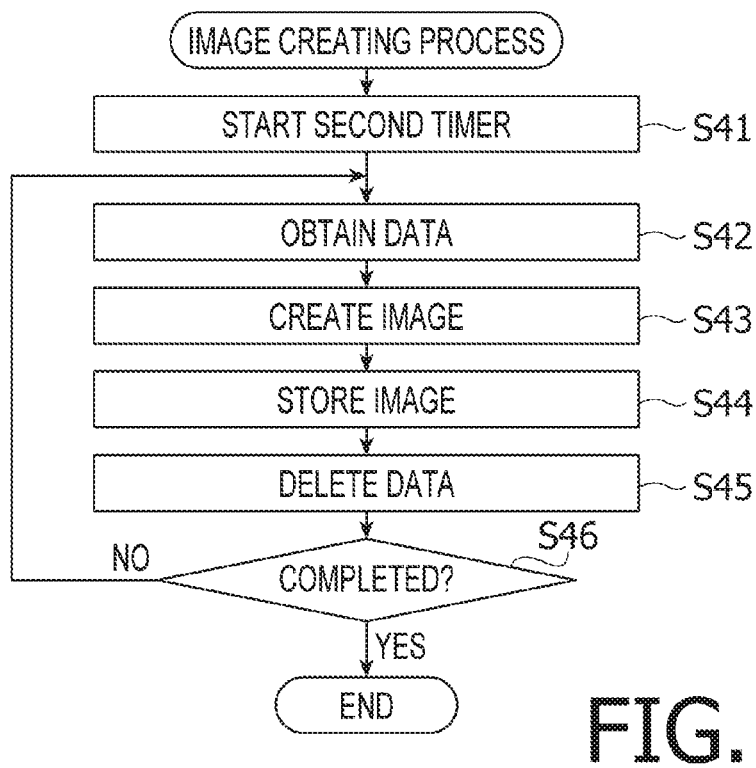
FIG. 5 is flowchart illustrating an image creating process according to the illustrative embodiment.

After execution of S5, the CPU 11 starts an image creating process to create an image based on the data stored in the buffer 4 (S4), and obtains an image creating time period representing a time period required to create the image based on the particular amount of data (S5). As shown in FIG. 5, when the image creating process is started, the CPU 11 starts a second timer to measure the image creating time period (S41). The CPU 11 obtains pieces of data stored in the buffer 4 in the order of receipt thereof (S42), and creates the image based on the obtained data (S43). It is noted that a method of creating an image based on the data received from the external device can be any one of known methods. The CPU 11 stores the created image in the SRAM 12 (S44), and deletes the data obtained in S44 from the buffer 4 (S45). It is noted that the CPU 11 add the amount of data deleted from the buffer 4 into the second counter. When it is determined that the data is still stored in the buffer 4 (S46: NO), the CPU 11 returns process to S42. When it is determined that no data is stored in the buffer 4 (S46: YES), the CPU 11 refers to the second timer to obtain the image creating time period, and terminates the image creating process. As shown in FIG. 3, the CPU 11 obtains 120.0 ms, 120.0 ms and 200.0 ms as the image creating time periods for the first-third concrete examples, respectively.

The CPU 11 calculates a preparation speed by dividing the particular amount received in S3 by the sum of the receiving time period obtained in S4 and the image creating time period obtained in S5 (see formula 1 below).

$$\text{Preparation Speed} = \text{Particular Amount}/(\text{Receiving Time Period} + \text{Image Creating Time Period}) \quad (1)$$

The CPU 11 calculates the preparation speeds for the concrete examples 1-3 to obtain 3333.3 (dots/sec.), 3125.0 (dots/sec.) and 2083.3 (dots/sec.), respectively. Then, the CPU 11 obtains a print speed (S7). It is noted that a particular speed may be preset as the printing speed, or the printing speed may be set at each printing process based on the user's instruction, the type of data and the like. According to the illustrative embodiment, the CPU 11 obtains 3189 (dots/sec.) as the printing speed for the concrete examples 1-3. It is noted that the 3189 (dots/sec.) is the maximum value of the printing speed that can be set to the printing apparatus 1.

In S8, the CPU 11 determines whether the preparation speed calculated in S6 is greater than the printing speed obtained in S7. The preparation speed for the concrete example 1 is 3333.3 (dots/sec.) which is greater than the printing speed 3189 (dots/sec.) (S8: YES). In such a case, the CPU 11 starts, in S18, a process of printing based on the data the CPU 11 started to receive in S1 at the constant printing speed of 3189 (dots/sec.) obtained in S7. The CPU 11 executes printing at the constant speed of 3189 (dots/sec.). The CPU 11 keeps the printing process based on the data until the process of printing at the printing speed obtained in S7 is finished (S19: NO). When the printing process based on the data has been finished (S19: YES), the CPU 11 terminates the printing process.

The preparation speed for the concrete example 2 is 3125.0 (dots/sec.) which is not greater than the printing speed 3189 (dots/sec.) (S8: NO). The preparation speed for the concrete example 3 is 2083.9 (dots/sec.) which is not greater than the printing speed 3189 (dots/sec.) (S8: NO). Therefore, in these cases, the CPU 11 obtains the total print length (S9). It is noted that the total print length is included, for example, in the header of the data of which reception was started in S1, and has been stored in the SRAM 12 during execution of a data receiving process, which is executed separately from the printing process. According to the illustrative embodiment, it is assumed that the CPU 11 obtains 28346.5 dots as the total print length. It is noted that the 28346.5 dots correspond to 2000.0 mm.

In S10, the CPU 11 calculates the number of printable lines. The number of printable lines is a value calculates by subtracting the total print length divided by the printing speed and multiplied by the preparation speed from the from the total print length obtained in S9 (see formula 2).

$$\text{The Number of Printable Lines} = \text{Total Print Length} - ((\text{Total Print Length}/\text{Print Speed}) \times \text{Preparation Speed}) \quad (2)$$

The CPU 11 calculates 568.7 dots as the number of printable lines for the concrete example 2, and 9827.9 dots for the concrete example 3.

In S11, the CPU 12 obtains the number of created lines by referring to the SRAM 12. The number of created lines is a value expressing the amount of data according to which images have been created by the number of line. The CPU 11 determines, in S12, whether the number of lines obtained in S11 is greater than the number of printable lines calculated in S10. When the number of created lines is not greater than the number of printable lines (S12: NO), the CPU 11 sets the particular amount to the number of printable lines to update the particular number (S17). Thereafter, the CPU 11 returns process to S2. When data indicating the particular amount, which has been updated to represent the particular amount in S17, is received in S3, which is repeatedly executed, the CPU 11 obtains the receiving time period which was required to receive the particular amount (before update) of data. This process assumes that the image creating process has already been started. In S5, the image creating time period required to create the image based on the updated particular amount of data is obtained.

When the number of created lines is greater than the number of printable lines (S12: YES), the CPU 11 starts, in S18, the printing process based on the data the CPU 11 has started to receive in S1 at the constant printing speed obtained in S7. The CPU 11 continues the printing process (S19: NO) until printing based on the data at the printing speed set in S14 is completed. When printing based on the data has completed (S19: YES), the CPU 11 terminates the printing process.

When it is determined that the upper limit amount of data has been received (S2: YES), the CPU 11 calculates the processing speed, at a time when the upper limit amount of data has been received, from reception of data to generation of image based on the received data as a preparation speed. Specifically, the CPU 11 refers to the first timer and obtains the receiving time period which was necessary to receive the particular amount of data (S13). Then, the CPU 11 refers to the second timer and obtains a time period from start of the image creating process till the CPU 11 has received the upper limit amount of data as the image creating time period (S14). In S15, the CPU 11 divides the amount of data based on which the image has been created until the upper limit amount of data has been received (i.e., the value of the second counter) by the sum of the receiving time period obtained in S13 and the image creating time period obtained in S14 to calculate the preparation speed (S15).

According to the printing apparatus 1, after the image creating process is started in S5, the data receiving process and the image creating process are executed in parallel. Therefore, the receiving time period obtained in S13 is defined as the time period until the image creating process is started in S5, that is, the time period until the particular amount of data has been received. The sum of the receiving time period obtained in S13 and the image creating time period obtained in S14 equals to a time period from start of the of data reception in S1 to receipt of the upper limit amount of data in S2. The reason why the CPU 11 sets a speed lower than the preparation speed calculated in S15 as the printing speed (S16) is to secure a margin of printing time in case a time rag is generated during the printing process.

The CPU 11 starts the process of printing (S18) based on the data which the CPU 11 has started receiving in S1 at the constant printing speed set in S16. The CPU 11 continues printing until the process of printing based on the data at the printing speed set in S16 is completed (S19: NO). When printing based on the data has been completed (S19: YES), the CPU 11 terminates the printing process.

According to the printing apparatus 1, printing is started at an appropriate timing so that printing can be performed at the designated printing speed, by taking the data reception condition and the processing condition of the printing apparatus 1. Therefore, the irregularity of printing due to change of the printing speed during the printing operation can be suppressed, and throughput (i.e., printing capability per unit time) can be improved. Further, according to the printing apparatus 1, the printing speed obtained in S7 is defined as the maximum value of the printing speed of the printing apparatus 1. Therefore, in comparison with a printing apparatus in which the printing speed is changed at every printing process, change of finishing state at every printing process can be suppressed, and the throughput can be improved.

According to the printing apparatus 1, when the data amount has reached the upper limit amount (S2: YES), the printing speed is set (S16) based on the receiving time period (S13) and the image creating time period (S14) with the upper limit amount being used as the particular amount. Then, the printing apparatus 1 starts printing (S16) based on the image at the constant printing speed which is set in S16.

The printing apparatus 1 is configured such that the upper limit amount can be set regarding the amount of data received before printing is started in S2. There are, for example, two methods to set the upper limit amount as indicated below.

One method is to define the upper limit amount by the number of printing media (e.g., the number of print copies) which are printed based on the data having been received. In this case, a divergence between the number of print copies assumed in the external device and the actual number of print copies printed by the printing apparatus 1 may be defined by the upper limit amount. The printing apparatus 1 can set the printing speed appropriately so that the printing speed need not be changed during the printing process, taking the receiving speed and the image creating speed into account.

The other method is to define the upper limit amount by the size of the data. In this case, the printing apparatus 1 can start printing before receiving the data of which amount exceeds the size storable in the buffer 4. The printing apparatus 1 can set the printing speed appropriately so that the printing speed need not be changed during the printing process, taking the receiving speed and the image creating speed into account.

Instead of the above, it may be determined whether the size of the data stored in the buffer 4 has reached the upper limit amount in S4. In this case, the printing apparatus 1 can set the upper limit value regarding the size of the data stored in the buffer 4 before printing is started. For example, the printing apparatus 1 can start printing before receiving the data exceeding the data amount storable in the buffer 4.

It is noted that the printing apparatus according to aspects of the disclosures need not be limited to the configuration described above, and can be modified in various ways without departing the aspects of the disclosures. For example, modifications (A) and (B) indicated below may be available.

(A) The configuration of the printing apparatus may be modified arbitrarily. For example, the printing apparatus may be provided with only one of the wireless communication I/F 19 and the wired communication I/F 20. The data may be received through the wired communication I/F 20. The storage which stores the programs may be HDD (hard disk drive), SSD (solid state disk) and the like.

(B) The steps of the printing process need not be limited to be executed by the CPU 11. That is, part of or all of the steps of the process may be executed by another electronical device (e.g., ASIC). Further, the steps of the printing process may be executed distributedly by a plurality of electronical devices (e.g., a plurality of CPU's). Further, the steps of the printing process may be modified depending on necessity such that the order of the steps may be changed, some steps may be omitted, or one or more steps may be added. It is noted that a configuration in which the OS (operating system) of the printing apparatus 1 executes a part of all of the process in accordance with the instruction of the CPU 11 to realize the above-described function(s) should be included in the aspects of the present disclosures.

For example, in the above-described illustrative embodiment, S2 and S13-S16 may be omitted. Further, the image creating process may be started before the particular amount of data has been received. Furthermore, when the data receiving process and the image creating process are executed in different periods, the receiving time period required to receive the upper limit amount of data may be obtained in S13, and the receiving time period required to receive the updated particular amount of data is obtained in S4 after execution of S17.

What is claimed is:
1. A printing apparatus, comprising:
a data receiving device;
a storage device configured to store programs; and
a controller,
wherein the controller causes, in accordance with the programs, the printing apparatus to perform:
   obtaining received data through the data receiving device and temporarily storing the received data in a buffer;
   creating an image to be printed on a printing medium in accordance with the received data;
   determining a receiving time period required to receive a particular amount of the received data through the data receiving device;
   determining an image creating time period required to create the image in accordance with the particular amount of the received data;
   determining a printing preparation speed based on the receiving time period and the image creating time period;
   determining whether the printing preparation speed is greater than a designated constant printing speed;
   in response to determining that the printing preparation speed is not greater than the designated constant printing speed:
      determining a total print length representing a length of the printing medium on which printing is executed in accordance with the received data;
      calculating an amount of image that must be created prior to starting a process of printing so that the process of printing can be performed at the designated constant printing speed, wherein calculating the amount of image is based on the receiving time period, the image creating time period and the total print length; and
      when the calculated amount of image can be created, starting the process of printing at the designated constant printing speed in accordance with the created image; and in response to determining that the printing preparation speed is greater than the designated constant printing speed, starting the process of printing the created image at the designated constant printing speed.

2. The printing apparatus according to claim 1,
wherein the controller causes, in accordance with the programs, the printing apparatus to perform:

setting a slower constant printing speed which is slower than the designated constant printing speed when the amount of the received data has reached an upper limit amount before the printing is started; and starting the process of printing at the slower constant printing speed in accordance with the created image.

3. The printing apparatus according to claim 2,
wherein the upper limit amount is defined by a number of printing media on which printing is executed in accordance with the received data.

4. The printing apparatus according to claim 2,
wherein the upper limit amount is defined by a size of the received data.

5. The printing apparatus according to claim 1,
wherein the controller causes, in accordance with the programs, the printing apparatus to perform:

setting a slower constant printing speed which is slower than the designated constant printing speed when the amount of the received data stored in the buffer has reached an upper limit amount before the printing is started; and starting the process of printing at the slower constant printing speed in accordance with the created image.

* * * * *